US006516234B2

United States Patent
Kamiguchi et al.

(10) Patent No.: US 6,516,234 B2
(45) Date of Patent: *Feb. 4, 2003

(54) INFORMATION TRANSMITTING SYSTEM FOR USE IN FACTORY

(75) Inventors: Masao Kamiguchi, Minamitsuru-gun (JP); Osamu Saito, Oshino-mura (JP); Atsuyuki Kukita, Oshino-mura (JP)

(73) Assignee: Fanuc Ltd., Yamanashi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,001
(22) PCT Filed: Dec. 3, 1997
(86) PCT No.: PCT/JP97/04424
§ 371 (c)(1),
(2), (4) Date: Dec. 3, 1998
(87) PCT Pub. No.: WO98/24586
PCT Pub. Date: Jul. 11, 1998

(65) Prior Publication Data
US 2002/0065571 A1 May 30, 2002

(30) Foreign Application Priority Data
Dec. 3, 1996 (JP) .......................................... 08-336245

(51) Int. Cl.[7] .............................................. G05B 11/01
(52) U.S. Cl. ................................. 700/20; 700/2; 700/5; 700/19; 700/95; 700/112; 700/214; 29/702; 29/701; 29/711; 29/739; 414/285; 414/807
(58) Field of Search .............................. 700/2, 4–5, 19, 700/20, 28, 60, 95, 100, 106, 112, 115, 116, 213–219, 228–230; 29/701, 702, 703, 711, 739; 414/285, 807

(56) References Cited

U.S. PATENT DOCUMENTS 4,566,837 A 1/1986 Shiomi et al.

(List continued on next page.)

FOREIGN PATENT DOCUMENTS

DE 34 45 792 A1 6/1986

(List continued on next page.)

OTHER PUBLICATIONS

Hidde A. R., et al: "Computer–Aided Manual Workstation as an Extension of the Product–Independent Flexible Factory Automation Concept" Computers in Industry, Elsevier Science Publishers. Amsterdam, NL, vol. 16, No. 3, Jul. 1, 1991, pp. 225–237.
Communication from EPO in corresponding application.
Copy of European Search Report from counterpart European application.

*Primary Examiner*—Ramesh Patel
(74) *Attorney, Agent, or Firm*—Staas & Halsey LLP

(57) ABSTRACT

An information transmitting system for use in a factory, which is capable of transmitting information among controllers simply without the complicated lead-around of a communication line nor the need of complicated communication protocol. A controller for every molding cell Ai, where i=1,2 . . . max and max is a maximum number of molding cells, a conveyance controller to control an automatic conveyor, a stock cell and a centralized controller are connected to each other via an Ethernet line to provide a common information storage unit, and information is transmitted among the controllers through the common information storage unit. Since there is no need of parallel communication lines between the controllers, an I/O port or a communication line may be prevented from increasing in number and the lead-around of the communication line is prevented from being complicated, resulting in a reduction of cost required for setting up the devices.

7 Claims, 6 Drawing Sheets

U.S. PATENT DOCUMENTS

| | | | | |
|---|---|---|---|---|
| 4,674,181 A | * | 6/1987 | Hamada et al. | 29/703 |
| 4,821,197 A | * | 4/1989 | Kenik et al. | 700/106 |
| 5,226,782 A | * | 7/1993 | Rigling | 414/283 |
| 5,246,332 A | * | 9/1993 | Bernard, II et al. | 414/807 |
| 5,371,940 A | * | 12/1994 | Suzuki et al. | 29/703 |
| 5,374,231 A | | 12/1994 | Obrist | 483/15 |
| 5,584,118 A | * | 12/1996 | Furukawa et al. | 29/701 |
| 5,799,800 A | * | 9/1998 | Lux | 209/559 |
| 6,061,887 A | * | 5/2000 | Kawasaki et al. | 29/407.01 |

FOREIGN PATENT DOCUMENTS

| | | |
|---|---|---|
| GB | 2 158 970 | 11/1985 |
| JP | 58-5804 | 1/1983 |
| JP | 61-278237 | 12/1986 |
| JP | 62-54657 | 3/1987 |
| JP | 62-244807 | 10/1987 |
| JP | 2-15957 | 1/1990 |
| JP | 2-80855 | 6/1990 |
| JP | 4-32908 | 2/1992 |
| JP | 4-75103 | 3/1992 |
| JP | 5-23931 | 2/1993 |
| JP | 8-110805 | 4/1996 |

* cited by examiner

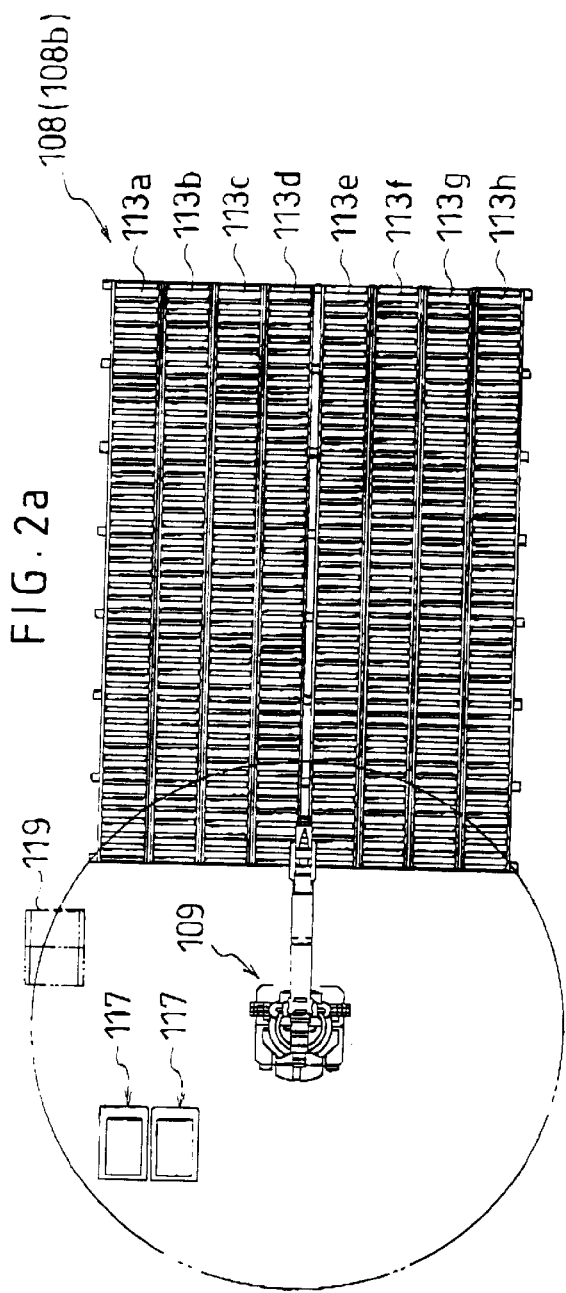
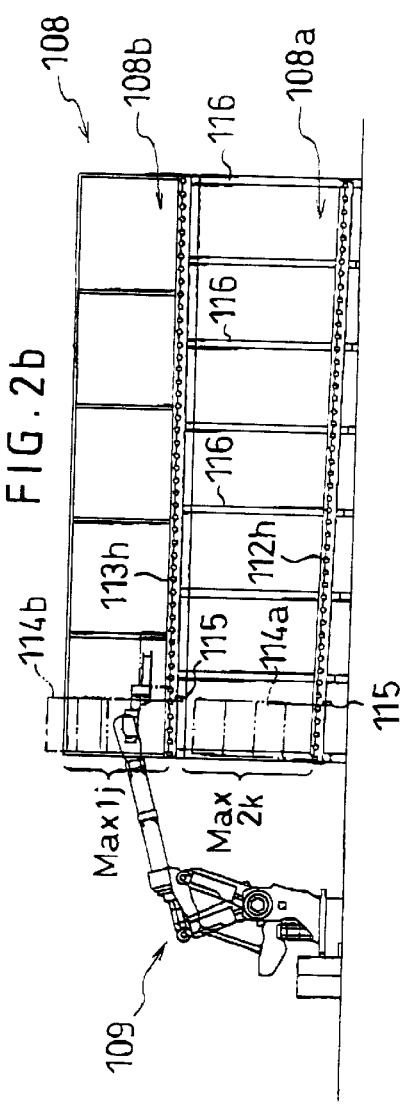

INFORMATION TRANSMITTING SYSTEM FOR USE IN FACTORY

This Application is a 371 of PCT/JP97/04424 filed Dec. 3, 1997.

TECHNICAL FIELD

The present invention relates to an information transmitting system for transmitting information among controllers of various machines for use in a factory.

BACKGROUND ART

For the purpose of interconnecting controllers of various machines for use in a factory so as to enable the transmission of information among the controllers, it is necessary to connect each controller to all the other controllers in parallel. Consequently, there arises a problem that with an increase of the controller in number, not only is an I/O port required for each controller but also a communication line increases in number (n number of controllers need n·(n−1)/2 number of communication lines).

With an increase of the number of communication lines, a thicker cable is needed, and an independent communication protocol is required for every combination of controllers for communication between the specific controllers. Further, a program to meet a plurality of communication protocols should be stored on each controller, resulting in a waste of memory.

Further, since a mode of communication is restricted by a structure of hardware such as an I/O port and the communication line, it is difficult to be adapted to system extension such as connection to additional controllers, and besides, it becomes hard to expand a communication facility by updating software. Further, since means for making sure of required communications is dependent entirely on the hardware, there arises a problem in that equipment for the hardware is quite expensive, while the complicated hardware makes it difficult to perform maintenance and inspection.

Further, information to be transmitted is stored in storage means, e.g., a hard disc or the like, of each controller and a microprocessor of each controller reads the information from the storage means and then transfers the information to the other controller via the I/O port and the communication line. In transferring the information, the procedure including a complicated protocol is required for communication between the microprocessors and there is a need for two-way data communication control of the information at all times in addition to the transmission and reception of the information, because a controller on the information transmitting side and a controller on the information receiving side should decide in cooperation with each other as to whether or not the information should be written, replaced, deleted and so on.

A stock delivery apparatus using a solid pallet stocker and a stacker crane robot has been available for a conventional automated storage and retrieval system. The solid pallet stocker has a large number of stock placing cells arranged in layers in horizontal and vertical directions, an address is assigned to each cell, a controller of the stacker crane robot checks the correspondence between the stocks and the addresses with reference to a file, and as a result, the stacker crane robot accesses each addressed cell to take out a required stock or store a delivered stock in each free address cell.

The stocks themselves are classified into pallets loaded with products and empty pallets, etc., and the pallets loaded with the products may be stored successively in free address cells, or in cells from which the empty pallets have been taken out. Consequently, there is no guarantee that the pallets loaded with the products or the empty pallets are stored close to each other in the adjacent cells. Accordingly, in the case of not only taking out the empty pallets, but also storing the pallets loaded with products, the stacker crane robot needs to move vertically and horizontally along the solid pallet stocker, resulting in a waste of access time.

Although it is possible to arrange the cells stored with the pallets loaded with products and the cells stored with the empty pallets into blocks by minutely controlling the addresses of the stock placing cells, there arises a problem that the stacker crane robot still wastes access time since the stacker crane robot has to move vertically and horizontally astride the blocks when alternating between storing the pallets loaded with products and taking out the empty pallets.

Further, in the case where it is necessary to sort the storage locations of the pallets loaded with products according to the product type, the number of the blocks increases, and there arises a problem that a more complicated operation is required. It is possible to cope with the above problem by arranging the solid pallet stockers to correspond to the kinds of products (in this case, each of the solid pallet stockers corresponds to the block), but as a matter of course, each solid pallet stocker needs to be equipped with the stacker crane robot, resulting in an increase of cost required for constructing the system. Besides, even doing so, the stacker crane robot still needs to move vertically and horizontally, and the access time itself is not reduced very much.

Further, since the stacker crane robot is just operated to transfer the stocks to or from the solid pallet stocker constituting stock spaces and cannot transship the stocks to or from another conveyance means, e.g., an automatic guided vehicle, there arises a problem that equipment constituting an automated system needs to be installed at quite an expense because additional robots for warehousing and delivery are required to transship the stocks, causing the equipment to be large scale.

DISCLOSURE OF INVENTION

It is an object of the present invention to provide an information transmitting system in a factory system which may transmit information simply among controllers without the complicated lead-around of a communication line or the need for a complicated communication protocol.

An information transmitting system of the present invention comprises: a plurality of controllers for controlling various machines in a factory; a communication line for interconnecting the plurality of controllers; and storage means connected to the communication line. The plurality of controllers transmit information to each other through the storage means and obtain information from the storage means by accessing the storage means.

Because the plurality of controllers are interconnected via an Ethernet or a ring-type communication line in a daisy chain format, a parallel line connection format is made unnecessary, an I/O port or a communication line is prevented from increasing in number, and the lead-around of the communication line is prevented from being made complicated. This results in a reduction of the total cost required for setting up the devices. Further, since the storage means for the transmission of information is shared among all the controllers, the information can be shared simply without using a complicated communication protocol by incorporating the same kind of driver software corresponding to the storage means, such as a hard disc, into each controller.

The information transmitting system of the invention has a stock cell for collecting and storing products produced by a machine, and the stock cell comprises: a plurality of lower conveyors arranged substantially horizontally and parallel to each other and having the same traveling direction to form a lower stock space; a plurality of upper conveyors arranged substantially horizontally and parallel to each other and having the same traveling direction above the lower conveyors to form an upper stock space on the lower stock space in layers; and a handling robot arranged in the vicinity of one of the ends of the lower and upper conveyors so that an operational range of the handling robot reaches one of the ends of the lower and upper stock spaces for taking out a first pallet stored in the lower stock space and a second pallet stored in the upper stock space from the respective stock spaces and for putting the first and second pallets into the respective stock spaces.

Since the delivery of stocks is performed with the handling robot arranged on one of the ends of the plurality of parallel conveyors, the handling robot does not need to move in a travel direction of the conveyor, that is, in a longitudinal direction of the stock space, resulting in a reduction of time required for the delivery of stocks. Further, since the handling robot is disposed for the lower and upper stock spaces formed by the plurality of horizontally parallel conveyors so that the operational range of the handling robot reaches one of the ends of all the conveyors, it is sufficient to use only one handling robot, and besides, the stocks may be transshipped by one handling robot to or from another conveyance means, i.e., an automatic guided vehicle, without needing additional robots for warehousing and delivery, resulting in a reduction of cost required for constructing the system.

Since the products made by the industrial machine are received in the first pallets, and the lower stock space to store the first pallets is formed by a plurality of horizontally parallel conveyors, the stocks may be controlled simply by using the conveyors properly according to the kind of products. Since no product is received in the second pallet stored in the upper stock space, constituent members for the upper stock space do not need high strength.

Further, each upper conveyor comprises a drive conveyor for feeding the pallets toward the handling robot, and each lower conveyor comprises an inclined coasting conveyor descending with the distance from the handling robot, so that the cost required for constructing the system is further reduced. The drive conveyor is adopted as the upper conveyor to ensure accurate operation so as to prevent the stocks from falling or dropping, and the inclined coasting conveyor is adopted as the lower conveyor to secure the stocks against falling or dropping as the lower conveyors are arranged at a low position.

Further, a lock pin to lock up the pallets or release the pallets from the locked state is arranged independently on.one of the ends of all the lower and upper conveyors on the side close to the handling robot, and as a result, the stocks already stored on the side of the stock space may be prevented by the lock pin from falling or dropping in delivery.

BRIEF DESCRIPTION OF DRAWINGS

FIG. 2a is a plan view showing an arrangement of a stock cell of the information transmitting system shown in FIG. 1;

FIG. 2b is a side view of the stock cell;

BEST MODE OF CARRYING OUT THE INVENTION

Figure 1:
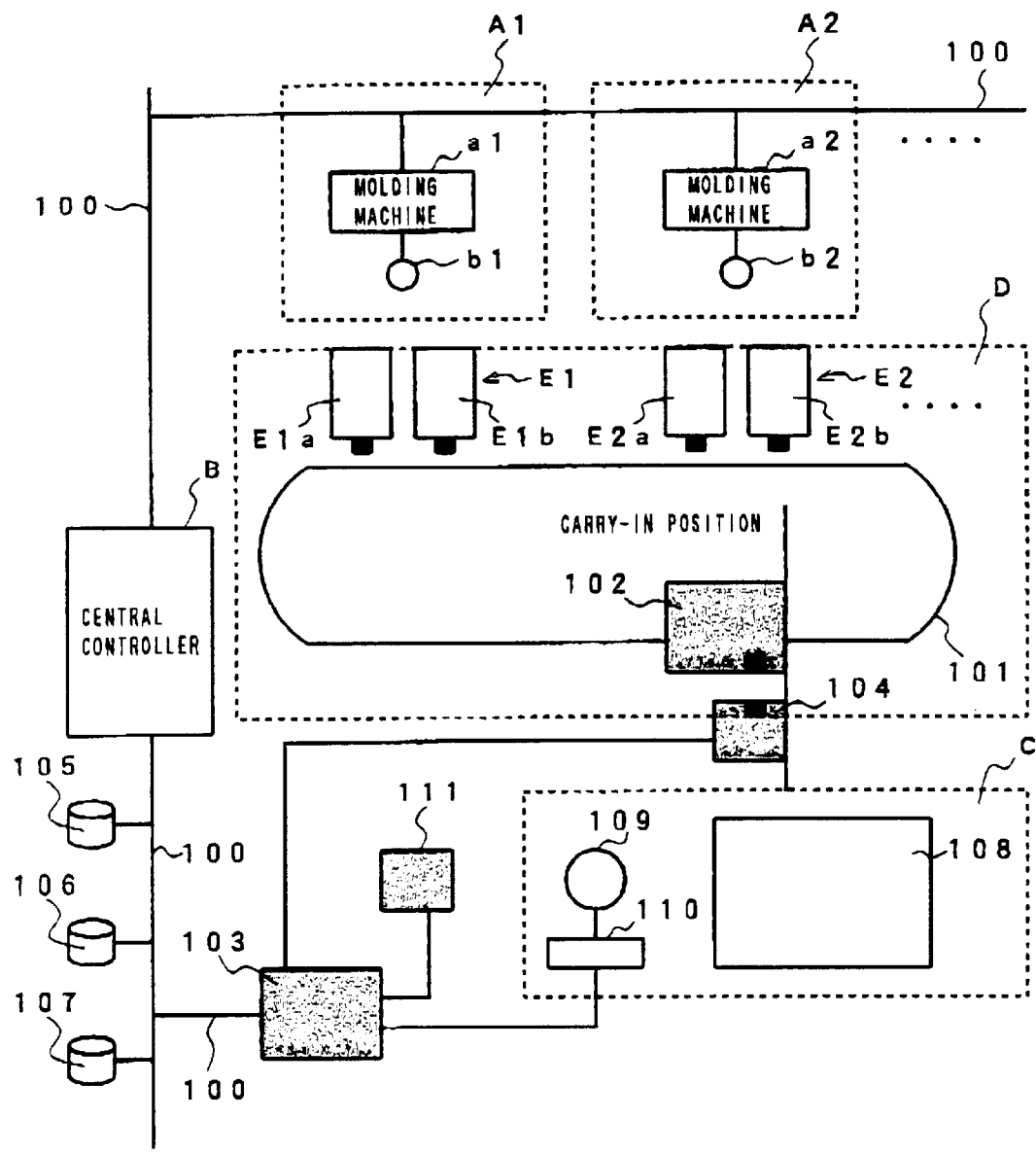
FIG. 1 is a block diagram schematically showing an arrangement of an information transmitting system according to one embodiment of the present invention.

FIG. 1 schematically shows an arrangement of a factory employing an information transmitting system of the present invention, and in this embodiment, there is shown a stock cell to collect and store molded products produced by injection molding machines.

As shown in FIG. 1, this factory system comprises a plurality of molding cells Ai (where i=1,2, ... max) and max is the maximum number of molding cells, arranged in an injection molding factory, a central controller B to control these molding cells, a stock cell C forming a robot warehouse, and a conveyance cell D to transfer molded products and pallets between the plurality of molding cells Ai in the injection molding factory and the stock cell C.

Among these components, each molding cell Ai comprises an injection molding machine ai(where i=1,2, ... max), a controller for the injection molding machine (not shown), a handling robot bi (where 1,2, ... max) serving as a pallet exchanging device for the injection molding machine ai and a controller for the handling robot (not shown). The controller for the injection molding machine ai and the controller for the handling robot bi are connected with each other via a RS232C cable so as to enable the transmission of data, and the controllers of the injection molding machines ai are respectively connected to the central controller B via an Ethernet line 100.

Further, the conveyance cell D comprises a plurality of automatic guided vehicle 102 arranged on a track 101 laid in connection with all the molding cells Ai and the stock cell C, a conveyance controller 103 to control the automatic guided vehicle 102, a conveyance indicator 104 arranged in the vicinity of a home position of the automatic guided vehicle 102 on the track 101 and wire or radio connected to the conveyance controller 103 so as to transmit data to or from the automatic guided vehicle 102 by optical communication, and a conveyor station Ei (where i–1,2, ... max) is provided for every molding cell Ai at a position between each molding cell Ai and the track 101 so as to transfer the molded products and the pallets between each molding cell Ai and the automatic guided vehicle 102. The automatic guided vehicle 102 has its own controller incorporated therein, and each of traveling routes to each molding cell Ai with the home position described above as a reference point is programmed in advance.

The conveyance controller 103 is available to control processing operations in the conveyance cell D and the stock cell C by giving a command to the conveyance indicator 104 of the conveyance cell D serving as an automatic conveyance means and a robot controller (which will be described later) of the stock cell C or the like and corresponds in a broad sense to a controller for the conveyance cell D and the stock cell C.

Each conveyor station Ei has a conveyor station sequencer for controlling the delivery of pallets and two pallet placing portions Eia and Eib for placing the pallets loaded with the molded products or the empty pallets, and is designed to transmit data between the conveyor station sequencer and the automatic guided vehicle 102 by optical communication, similar to the relation in data transmission between the conveyance indicator 104 and the automatic guided vehicle 102.

The conveyance controller 103 is connected to the centralized controller B via the Ethernet line 100, and to the Ethernet line 100 is connected a schedule storage means 105 to store data related to an operation schedule or the like for each injection molding machine ai, a logging data storage means 106 to store an operation history or the like of each injection molding machine ai or the like and a common information storage means 107 to store a request signal and data or the like required for the transmission of information between the cells. Each of these storage means is composed of a storage medium such as a hard disc and its drive unit or the like. Among these storage means, at least the common information storage means 107 enables write and call or the like of data from any of the centralized controllers B, the controller of each injection molding machine ai and the conveyance controller 103. The simplest method is by regarding the centralized controller B as a server machine to operate these storage means under control of the centralized controller B, while regarding the other controllers as client machines to input and output information through the centralized controller B.

While internal information in all of the schedule storage means 105, the logging data storage means 106 and the common information storage means 107 may be shared with the centralized controller B, the controller of each injection molding machine ai and the conveyance controller 103, the common information storage means 107 is accessed most frequently by the centralized controller B, the controller of each injection molding machine ai and the conveyance controller 103. While the common information storage means 107 is shown as a means connected to the communication line 100 independent of the centralized controller B in the embodiment of FIG. 1, it may be sufficient to mount the common information storage means for the centralized controller B, the controller for each injection molding machine ai and, the conveyance controller 103 together.

As shown in a plan view of FIG. 2a and a side view of FIG. 2b, the stock cell C comprises a pallet stocker 108 composed of two stock spaces 108a and 108b arranged vertically in layers at an interval and formed by a plurality of conveyors, a handling robot 109 arranged on one end side of the pallet stocker 108, a robot controller 110 and a label printer 111 connected to the conveyance controller 103.

As shown in FIGS. 2a and 2b, the lower stock space 108a and the upper stock space 108b in the pallet stocker 108 are respectively formed by eight lanes of inclined coasting conveyors 112a to 112h and eight lanes of drive conveyors 113a to 113h. As only upper stock space 108b is shown in FIG. 2a and only one row of both the upper and lower stock spaces 108a, 108b is shown in FIG. 2b, which is a side view, only one of the eight lanes (112h) of inclined coasting conveyors 112a to 112h is depicted in the figures. However, it should be understood that lanes 112a through 112h correspond to lanes 113a through 113h of upper stock space 108b, as shown in FIG. 2a. The inclined coasting conveyor hereupon means a conveyor designed to move stocks on the conveyor by making use of the stock's own weight and gravity and is operated, in this embodiment, to feed each pallet carried by the handling robot 109, i.e., each pallet 114a loaded with a molded product toward the downstream side of the inclined coasting conveyors 112a to 112h with the side of the handling robot 109 as the upstream, so that the inclined coasting conveyors 112a to 112h of the lower stock space 108a are arranged as gradually descending with the distance from the handling robot 109. A traveling means required for coasting is formed by rollers or the like laid all over the inclined coasting conveyors 112a to 112h.

In the upper stock space 108b, since the empty pallets 114b stored in the upper stock space 108b are sequentially taken out after having been drawn toward the handling robot 109, the drive conveyors 113a to 113h are operated to feed the empty pallets 114b in the reverse direction to the feed by the inclined coasting conveyors 112a to 112h. Incidentally, a drive means is individually provided for every conveyor 113a to 113h, although not shown in FIGS. 2a and 2b in particular. In case of using a plurality of kinds of pallets, the pallets classified in every lane are placed on the conveyors 113a to 113h of the upper stock space 108b.

A lock pin 115 to lock up the pallets 114a and 114b or release the pallets from the locked state is fixedly provided on each of the upstream sides of the inclined coasting conveyors 112a to 112h and the downstream sides (i.e., the side closest to the handling robot 109) of the drive conveyors 113a to 113h. Strictly speaking, the lock pin 115 is located at a position downstream from the upstream end of each of the inclined coasting conveyors 112a to 112h by a pitch corresponding to a width of the pallet 114a, and also at a position upstream from the downstream end of each of the drive conveyors 113a to 113h by a pitch corresponding to a width of the pallet 114b and is provided one by one in each location for every conveyor.

The drive conveyors are adopted as conveyors for the upper stock space 108b for the reason that it is necessary to ensure accurate operation so as to prevent the stocks from falling or dropping, while the inclined coasting conveyors are adopted as conveyors for the lower stock space 108a for the reason that these conveyors are arranged at a low position and the stocks are secure against falling or dropping. Since the upper stock space 108b is only available to store the empty pallets 114b, so much structural strength is not required, and a strut 116 to support the upper stock space may be less expensive.

The handling robot 109 includes an articulated industrial robot having a manipulator at an end to grasp an edge of the pallet, and the operational range of the handling robot 109 reaches all the upstream ends of the inclined coasting conveyors 112a to 112h and all the downstream ends of the drive conveyors 113a to 113h, as shown by a two-dotted chain line in FIG. 2a. Incidentally, reference numeral 117 denotes a temporary support table for the empty pallet, and the temporary support table is arranged within the operational range of the handling robot 109. In case of using a plurality of kinds of pallets, a plurality of temporary support tables 117 are required for the empty pallets, as a matter of course. Reference numeral 119 denotes a carry-in position of the pallet, that is, a home position of the automatic guided vehicle 102.

Simply by lengthening each conveyor, it is possible to satisfy the need of storing a large number of pallets in the lower stock space 108a or the upper stock space 108b. The conventional stacker crane robot needs to move vertically and horizontally along a longitudinal direction of the solid pallet stocker and therefore presents a problem in access time or the like, whereas the handling robot 109 in this embodiment does not need to move in the longitudinal direction of the solid pallet stocker, i.e., in the longitudinal direction of the conveyor and may deliver the stocks at the end position of each conveyor at all times, resulting in no waste of access time as well.

Further, since it is possible to store the pallets classified for every conveyor lane, the required pallets may be taken out or stored simply by accessing the end of any conveyor.

Since the temporary support tables 117 for the pallets and the home position 119 of the automatic guided vehicle 102 are placed within the operational range of the handling robot 109, all the processing related to carry-in and carry-out of the stocks may be performed by only one handling robot 109.

For the purpose of starting an automatic molding operation and molded product collection and automatic pallet exchange operations or the like by operating the whole system, it is necessary in the first place to create a molding schedule or like data base for the whole processing operation.

That is, the molding schedule data base is a collection of a file containing a set of data to specify the contents of the injection molding operation and a combination of a name of the molding cell expected to perform the injection molding operation specified by the file and a running order of files. The set of data to specify the contents of the injection molding operation includes information representing, for instance, a mold to be mounted on the injection molding machine, a resin to be used, molding conditions, an operation program of the handling robot serving as the pallet exchanging device for the injection molding machine, a kind of pallets to be used for collection of the molded products, the number of products on a lot basis and the total lot number or the like.

In case of the molding operation performed with a single injection molding machine, while a continuous molding operation may be made if the set of data to specify the contents of the injection molding operation is completed, it is necessary to decide that an operation specified by which file is performed in what order in each molding cell for the purpose of performing the injection molding operation in parallel by making use of a plurality of molding cells or in time series for every molding cell. For that reason, there is a need for data related to the combination of the name of the molding cell expected to perform the injection molding operation specified by the file and the running order of the files, and the data base containing this data together with all the files each containing the set of data to specify the contents of the injection molding operation as described above is given as the molding schedule data base. When the number of products on a lot basis and the total lot number are specified simultaneously in the file, the injection molding machine performs the continuous molding operation in a plurality of steps on the same conditions, as a matter of course.

An operator (a supervisor or the like) makes use of the centralized controller B or the like to create preliminary the molding schedule or like data base which is then stored in the schedule storage means 105.

In operation of the system, the operator of each cell firstly starts the controller of each injection molding machine ai, then operates its Manual Data Input (MDI) unit to read a file of the first predetermined operation schedule for the corresponding cell Ai from the schedule storage means 105 through the centralized controller B and causes a display unit of the injection molding machine to display this information. Incidentally, the name of the file expected to be run in the injection molding machine of the Ai-numbered cell, that is, the fact that the injection molding machine of the Ai-numbered cell performs which injection molding operation on schedule is recognized by the centralized controller B at all times.

The information displayed hereupon includes the information representing the mold to be mounted on the injection molding machine, the resin to be used, the molding conditions, the operation program of the handling robot serving as the pallet exchanging device for the injection molding machine, the kind of pallets to be used for collection of the molded products, the number of products on a lot basis and the total lot number or the like, as described above.

Among the above information, since the information related to the molding conditions and the operation program of the handling robot are stored automatically in a memory of the controller of the injection molding machine ai, and the number of products on a lot basis is set automatically as a target value in a counter of the injection molding machine, no operator action is necessary. Further, the information related to the total lot number is monitored by the centralized controller B and the logging data storage means 106 after the start of an automatic operation, and therefore, bears no relation with the operator's action.

The operator needs to carry out practically only three kinds of operations, that is, an operation to mount the specified mold on the injection molding machine ai, an operation to switch a resin in a hopper to a specified resin and an operation to set up pallets for collection of molded products at the moment of an automatic operation. The mold mounting operation and the resin switching operation are similar to the prior art, while the operation to set up the pallets for collection of the molded products is made by operating the system in the present embodiment through an operation to press a pallet request function key or the like provided on the MDI unit or the display unit of the injection molding machine ai.

Figure 3:
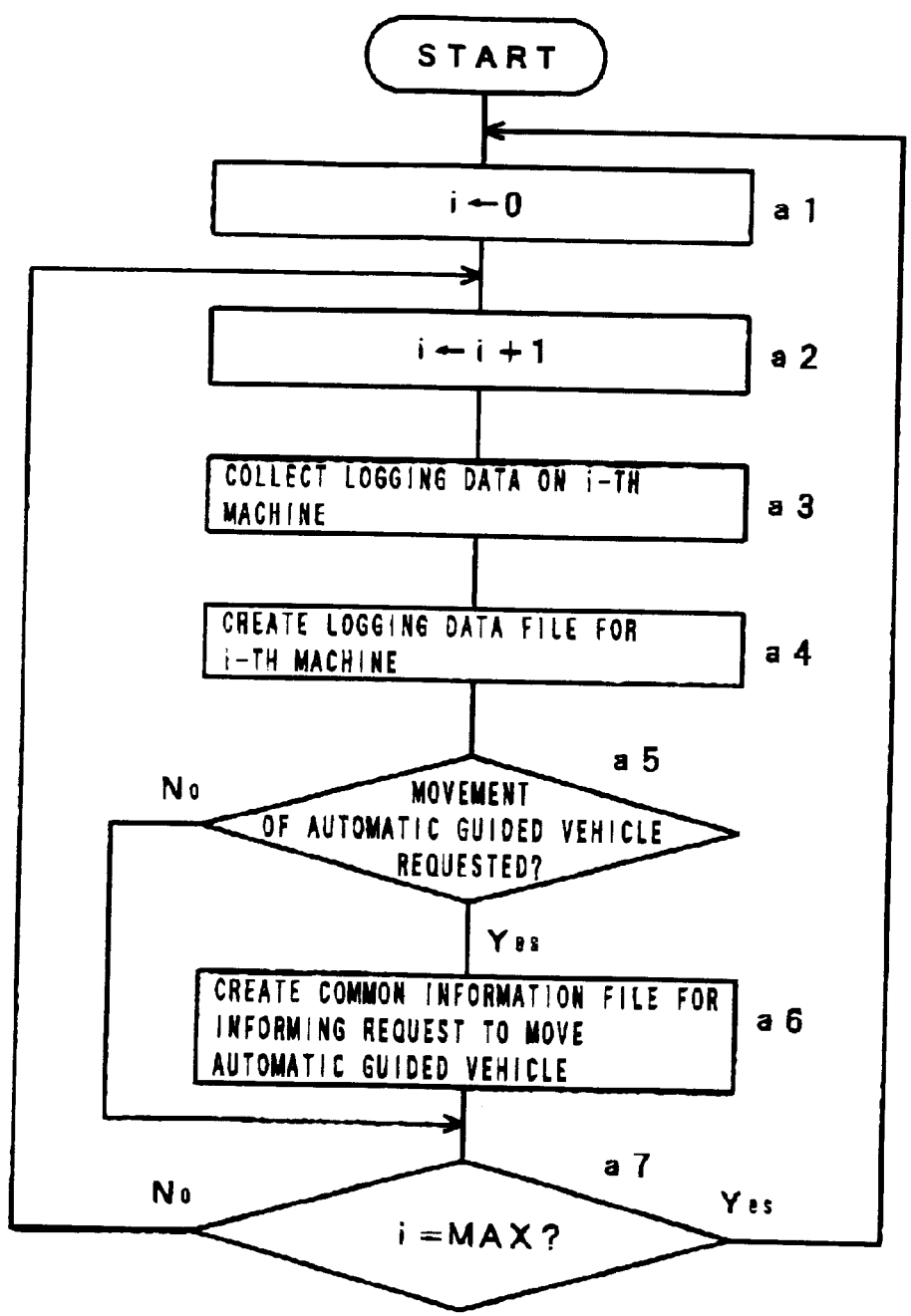
FIG. 3 is a flowchart showing an outline of processing to be performed by a central controller of the information transmitting system shown in FIG. 1.

On and after the power is applied to the system, the centralized controller B performs the supervisory processing related to the collection of information as shown in FIG. 3 so as to collect logging data (operation history) for each injection molding machine, while detecting the generation of a request signal or the like by accessing the controllers of the injection molding machines of A1 to AMAX-numbered molding cells (in case where the molding cells are MAX in number) in sequence. That is, a value in a scanning counter i representing an objective molding cell for accessing is limited to an integer in the range of 1 to MAX through the processing in Steps a1, a2 and a7, and the centralized controller B performs the processing in Steps a3 to a6 for each injection molding machine whenever the centralized controller B accesses the controllers of the injection molding machines of the A1 to AMAX-numbered molding cells in sequence.

After the centralized controller B has accessed the controller of the injection molding machine of the Ai-numbered molding cell on the basis of the value of the scanning counter i, the centralized controller B firstly reads the logging data and various request signals or the like from the memory of the controller of the injection molding machine of the Ai-numbered molding cell (Step a3) and stores new logging data, if stored in the memory of the injection molding machine, in the manner of adding to the file of the logging data storage means 106 (Step a4). The logging data storage means 106 has a directory on a molding cell basis, and the logging data is entered in time series into each directory for every molding cell. The logging data includes data representing, for instance, the number of products and molding data on a shot basis or the like. Incidentally, since the substantial operation on the injection molding machine side is not started in the stage of a set-up operation, the logging data related directly to molding is not extracted. The various request signals or the like are read by the centralized controller B together with the logging data.

Further, if the various request signals such as pallet request signals are stored in the controller of the injection molding machine of the Ai-numbered molding cell by the operation to press the function key or the like described above (Step a5), the centralized controller B writes the pallet request signal and its corresponding molding cell number Ai in association with each other as a file in the common information storage means 107 and deletes original data on the side of the controller of the injection molding machine (Step a6).

In this case, since a manual pallet request signal is written into the controller of the injection molding machine ai through the operation of the pallet request function key provided on the MDI unit or the display unit of the injection molding machine ai, the centralized controller B writes the molding cell number Ai and the manual pallet request signal in association with each other into the common information storage means 107.

Figure 4:
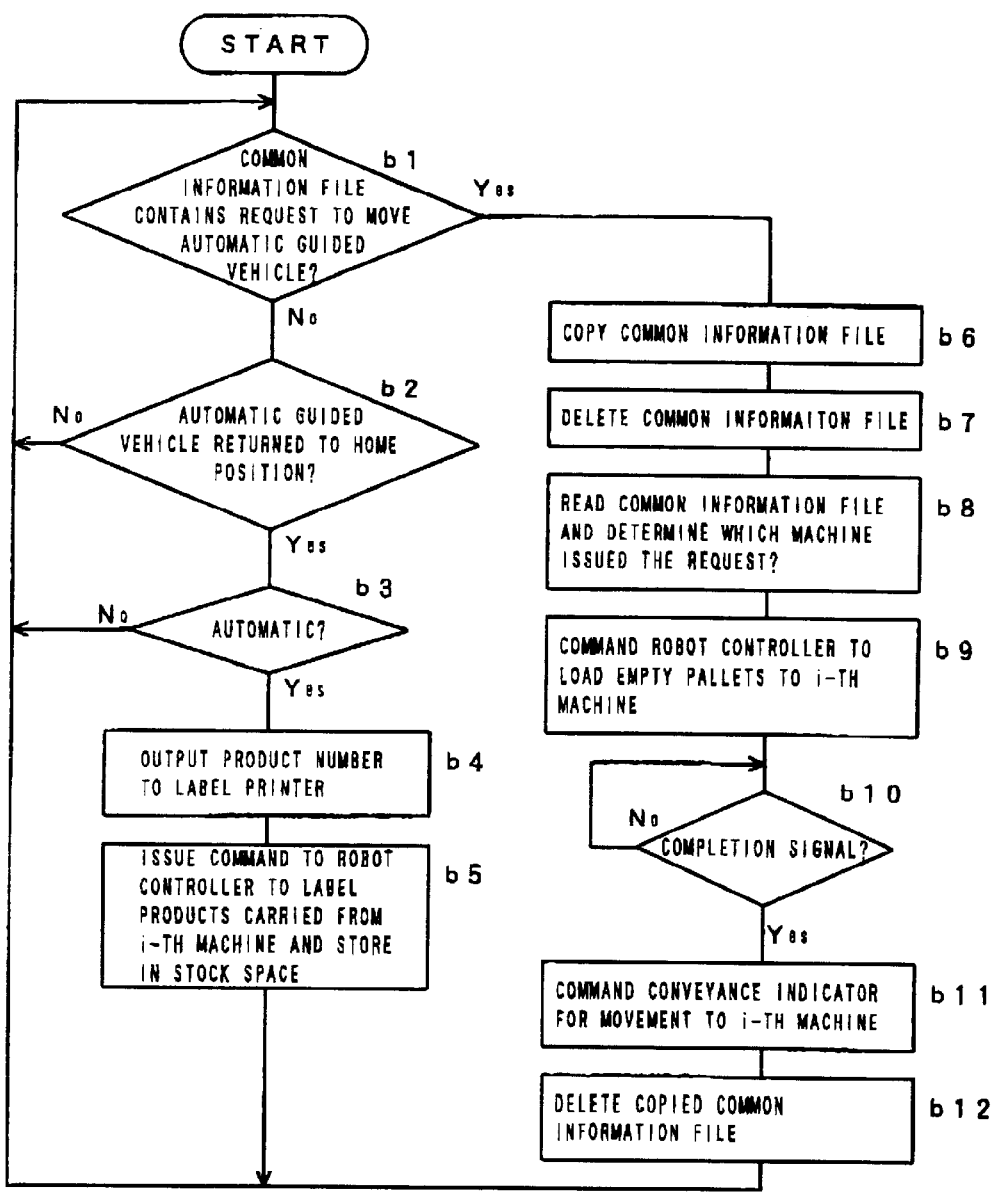
FIG. 4 is a flowchart showing an outline of processing to be performed by a conveyance controller.

Further, the conveyance controller 103 monitors the common information storage means 107 at all times and performs continuously the supervisory processing as shown in FIG. 4. When the conveyance controller 103 detects that a manual or automatic pallet request is written into the common information storage means 107 (Step b1), the conveyance controller 103 temporarily reads out this information to copy the read-out information into a memory of the conveyance controller 103 (Step b6) and deletes original information on the side of the common information storage means 107 (Step b7).

Subsequently, the conveyance controller 103 reads out again the information from its own memory (Step b8), checks the number Ai of the molding cell, from which the manual or automatic pallet request signal has been outputted, issues a command to the robot controller 110 on the side of the stock cell C so as to load the empty pallets 114b into the automatic guided vehicle 102 (Step b9), and is placed in a stand-by state till the reception of an operation completion signal from the robot controller 110 (Step b 10).

Figure 5:
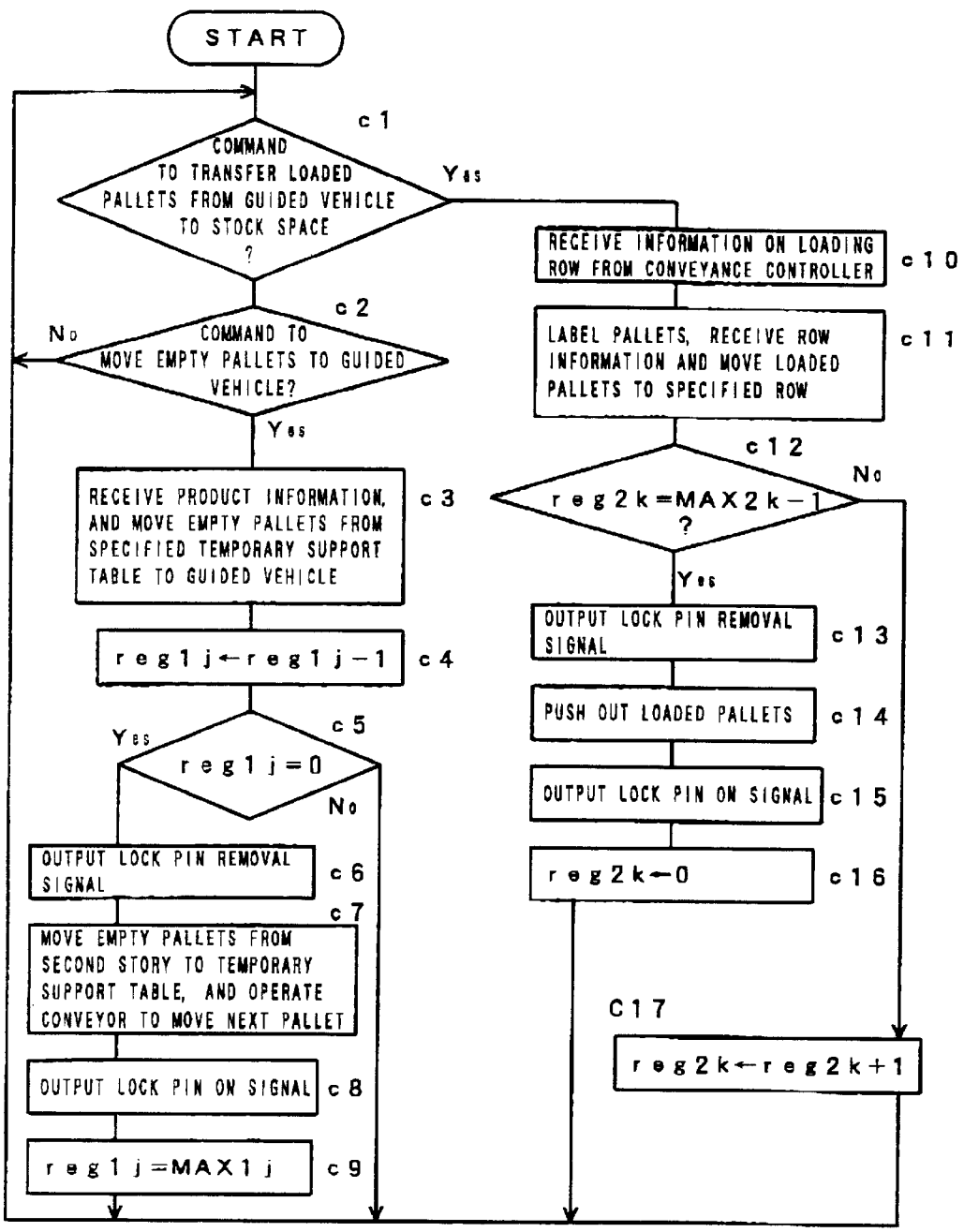
FIG. 5 is a flowchart showing an outline of processing to be performed by a robot controller.

On the other hand, the robot controller 110 performs continuously the supervisory processing as shown in FIG. 5. That is, when the robot controller 110 receives an empty pallet loading request and the molding cell number Ai from the conveyance controller 103 (Step c2), the robot controller 110 makes access to the centralized controller B via the Ethernet line 100 to check whether the injection molding machine of the Ai-numbered cell performs which injection molding operation on schedule or a set-up operation, then checks the kind of pallets stored in the file expected to be run in the injection molding machine of the Ai-numbered cell with reference to the schedule storage means 105, selects the temporary support table 117 according to the kind of pallets, controls drive of the handling robot 109 to load one empty pallet 114b picked up from the objective temporary support table 117 into the automatic guided vehicle 102 located at the home position 119 and outputs the operation completion signal to the conveyance controller 103 (Step c3).

Incidentally, since MAX1j-layered empty pallets are stacked up on each temporary support table 117, there is no possibility that the required pallets reach the bottom in the stage of the set-up operation.

After the empty pallet has been taken out and then loaded into the automatic guided vehicle 102, the robot controller 110 decrements a value of a remaining empty pallet count storage register reg1j by 1 and stores the fact that one empty pallet has been taken out (Step c4).

Incidentally, as shown in FIG. 2b, an initial value of the reg1j is given by the number of layers MAX1j of the empty pallets 114b stacked on the upper stock space 108b of the pallet stocker 108. As described above, the different kinds of pallets classified for every lane may be stored on the drive conveyors 113a to 113h on the upper side of the pallet stoker 108 in this embodiment, a plurality of rows of temporary support tables 117 are provided for each lane. That is, there are eight pieces of remaining empty pallet count storage registers reg1j, j=1 to 8, that is, as many as the kinds of pallets or the lanes, and a value as the number of layers MAX1j of the stacked empty pallets varies for every lane in some cases. Depending on pallet information of the file read from the schedule storage means 105 through the processing in Step c3, it is decided that accessing to the temporary support table 117 corresponding to which lane is made or the value is decremented from which remaining empty stock count storage register reg1j. As a matter of course, the temporary support tables 117 have a one-to-one correspondence with the drive conveyors 113a to 113h.

Subsequently, the robot controller 110 decides as to whether or not a value of the remaining empty pallet count storage register reg1j reaches 0, that is, the last empty pallet has been taken out from the corresponding temporary support table 117 (Step c5). If the value of the reg1j reaches 0, it means that a stock of empty pallets on the temporary support table 117 ran out, that is, the subsequent pallet takeout operation is not permitted.

In such a case, the robot controller 110 retreats the lock pin 115 (Step c6) by operating a solenoid drive means or the like of the drive conveyor of the lane corresponding to the temporary support table in which the empty pallets ran out, then controls drive of the handling robot 109 to take out the empty pallets 114b for one packet from the downstream end (i.e., the left end in FIG. 2b) of the drive conveyor of the corresponding lane, places the taken-out empty pallets on the corresponding temporary support table 117 while operating the drive conveyor of the corresponding lane to make progress toward the downstream side by a distance corresponding to a pallet width, then shifts the next empty pallets 114b for one packet to the downstream end position where the empty pallets were taken out a little while ago (Step c7), and operates the solenoid drive means or the like again to project the lock pin 115 so as to prevent the empty pallets 114b from being shifted from the predetermined position on the conveyor (Step c8).

Subsequently, the robot controller 110 sets a value of MAX1j into the corresponding remaining empty pallet count storage register reg1j and stores the fact that new empty pallets for one packet (MAX1j pieces of empty pallets) have been carried into the corresponding temporary support table 117 (Step c9).

On the other hand, after the conveyance controller 103 has detected the operation completion signal outputted through the processing in Step c3 on the side of the robot controller 110, the conveyance controller 103 issues a command to the conveyance indicator 104 so as to move the automatic guided vehicle 102 to the Ai-numbered molding cell from which the manual pallet request signal has been outputted (Step b11), and deletes the information stored in its own memory through the processing in Step b6, that is, the manual pallet request signal and the information related to the molding cell number Ai which specifies the output source of the manual pallet request signal (Step b12).

In response to the move command issued through the processing in step b11, the conveyance indicator 104 transmits data by optical communication to inform the controller of the automatic guided vehicle 102 about the fact that the Ai-numbered molding cell is the destination of the automatic guided vehicle, and that this move command is issued in response to the manual pallet request signal.

The conveyance indicator informs explicitly the controller of the automatic guided vehicle 102 about the fact that the move command is issued in response to the manual pallet request signal, for the reason that the manual pallet request signal and the automatic pallet request signal are different from each other in a sequence (an operation program) started on the side of the controller of the automatic guided vehicle 102. That is, in case of the automatic pallet request signal, an operation to collect the pallets loaded with the molded products on the side of the molding cell is included in the sequence together with an operation to feed new empty pallets, whereas in case of the manual pallet request signal, no operation to collect the loaded pallets but the operation to feed the new empty pallets is included in the sequence.

In response to the move command from the conveyance indicator 104, the automatic guided vehicle 102 moves to the position of the objective molding cell Ai along the track 101 according to the operation program stored in its own controller, subsequently transmits data by optical communication to or from the conveyor station Ei of the molding cell Ai to place the empty pallets on the pallet placing portion Eia, then starts movement toward the home position again, stops the movement when finally reaching the home position, transmits data by optical communication to or from the conveyance indicator 104 to inform the conveyance controller 103 about the fact that the automatic guided vehicle returns to its own home position and that the movement of the automatic guided vehicle is based on the manual pallet request signal, and deletes its own internal information.

After the operator has shifted one empty pallet from the pallet placing portion Eia to the pallet placing portion Eib, the operator operates the pallet request function key or the like provided on the MDI unit, the display unit or the like again to cause the system to perform the operation similar to above so as to place the second empty pallet on the pallet placing portion Eia.

According to the above processing, unused empty pallets are fed to the pallet placing portions Eia and Eib of the Ai-numbered molding cell, and the start of a continuous molding operation in this cell is enabled. Other molding cells are quite similar to the above in the processing operation required for setting-up. It is possible not only to start the continuous molding operation simultaneously after the operation to set up all the molding cells, but also to start the continuous molding operation individually from the already set-up molding cell, in other words, to start the continuous molding operation in some of the molding cells before setting up the other molding cells.

While the home position return signal from the automatic guided vehicle 102 is detected through the decision processing in Step b2 included in the supervisory processing on the side of the conveyance controller 103 as shown in FIG. 4, the automatic guided vehicle is moved on the basis of the manual pallet request signal (Step b3) in case of an operation to set up the empty pallets, and therefore, no processing in Steps b4 and b5 on the side of the conveyance controller 103 is necessary (the automatic guided vehicle 102 does not carry back the pallet loaded with the molded product).

A description will now be generally given of the processing operation of each injection molding machine ai, the centralized controller B, the logging data storage means 106, the common information storage means 107, the conveyance controller 103, the robot controller 110, the label printer 111 and the automatic guided vehicle 102 or the like when the molding cells start partially or wholly the continuous molding operation.

As described above, the injection molding machine ai of each molding cell starts the continuous molding operation according to the molding conditions determined by the file of the schedule storage means 105 and updates a value of a shot counter every time one molding cycle is completed. Further, injection pressure or holding pressure in an injection/pressure-holding step is sampled and so on by the controller on the side of the injection molding machine similar to the prior art, and the logging data such as shot count and sampling data is successively entered into the corresponding directory of the logging data storage means 106 through the processing on the side of the centralized controller B shown in FIG. 3.

Further, the handling robot bi takes out the products according to the operation program determined by the file of the schedule storage means 105 and successively loads the products molded by the injection molding machine into the empty pallets on the pallet placing portion Eia. However, the products molded by the injection molding machine are not always loaded into the empty pallets on the pallet placing portion Eia, but the destination of the molded products is switched over from the pallets on the pallet placing portion Eia to those on the pallet placing portion Eib and vise versa every time the counter of the injection molding machine ai counts the products of that lot until the production for one lot is completed.

After the counter of the injection molding machine ai counts the products of that lot until the production for one lot is completed in the course of the repetitive performance of the above processing by the injection molding machine ai and the handling robot bi, the controller of the injection molding machine generates automatic pallet request data, which represents a request to carry in the empty pallet, in its memory. In response to one lot production completion signal from the controller of the injection molding machine, the controller of the handling robot bi switches over the destination of the molded products from the pallets on the pallet placing portion Eia to those on the pallet placing portion Eib and vice versa, that is, from the pallets on one pallet mounting portion to those on the other, and informs the controller of the conveyor station Ei about which of the pallet placing portions Eia and Eib serves as the pallet placing portion stacked with the pallets expected to be loaded with the molded products on this occasion, that is, the pallet placing portion after the operation to switch over the destination of the molded products.

As described above, the automatic pallet request signal stored in the memory of the injection molding machine ai is detected through the supervisory processing in the centralized controller B shown in FIG. 3 (Step a3), and the centralized controller B writes the automatic pallet request signal and its corresponding molding cell number Ai in association with each other as a file into the common information storage means 107 and deletes the original data on the side of the controller of the injection molding machine (Steps a4 to a6).

Further, the conveyance controller 103 performs the supervisory processing shown in FIG. 4 similarly to the above, that is, detects that the automatic pallet request is written into the common information storage means 107 (Step b1), then checks the number Ai of the molding cell, from which the pallet request signal has been outputted, issues a command to the robot controller 110 on the side of the stock cell C so as to load the empty pallets 114b into the automatic guided vehicle 102 (Steps b6 to b9), and is placed in a stand-by state until the reception of the operation completion signal from the robot controller 110 (Step b10).

The robot controller 110 also performs the supervisory processing shown in FIG. 5 similarly to the above, that is, receives the empty pallet loading request and the molding cell number Ai from the conveyance controller 103 (Step c2), then checks the kind of pallets stored in the file expected to be run in the injection molding machine of the Ai-numbered cell, selects the temporary support table 117 according to the kind of pallets, controls drive of the handling robot 109 to load one empty pallet 114b picked up from the temporary support table 117 into the automatic guided vehicle 102 and outputs the operation completion signal to the conveyance controller 103 (Step c3).

As a matter of course, if the empty pallets on each temporary support table 117 run out, the same kind of empty pallets 114b for one packet may be taken out and then placed on the corresponding temporary support table 117 (Steps c4 to c9).

Further, after the conveyance controller 103 has detected the operation completion signal outputted from the robot controller 110 through the processing in Step b10, the conveyance controller 103 issues a command to the conveyance indicator 104 similarly to the above so as to move the automatic guided vehicle 102 to the Ai-numbered molding cell, from which the automatic pallet request signal has been outputted, and deletes the automatic pallet request and the information related to the molding cell number Ai, which specifies the output source of this automatic pallet request signal, from its own memory (Steps b11 and b12).

In response to the move command issued through the processing in Step b11, the conveyance indicator 104 transmits data by optical communication to inform the controller of the automatic guided vehicle 102 about the fact that the Ai-numbered molding cell is the destination of the automatic guided vehicle and that this move command is issued in response to the automatic pallet request signal.

The conveyance indicator informs explicitly the controller of the automatic guided vehicle 102 about the fact that the move command is issued in response to the automatic pallet request signal, for the reason that the manual pallet request signal and the automatic pallet request signal are different from each other in sequence (an operation program) started on the side of the controller of the automatic guided vehicle 102. As described above, the operation to collect the pallets loaded with the molded products on the side of the molding cell is included in the sequence together with the operation to feed the new empty pallets in case of the automatic pallet request signal.

Figure 6:
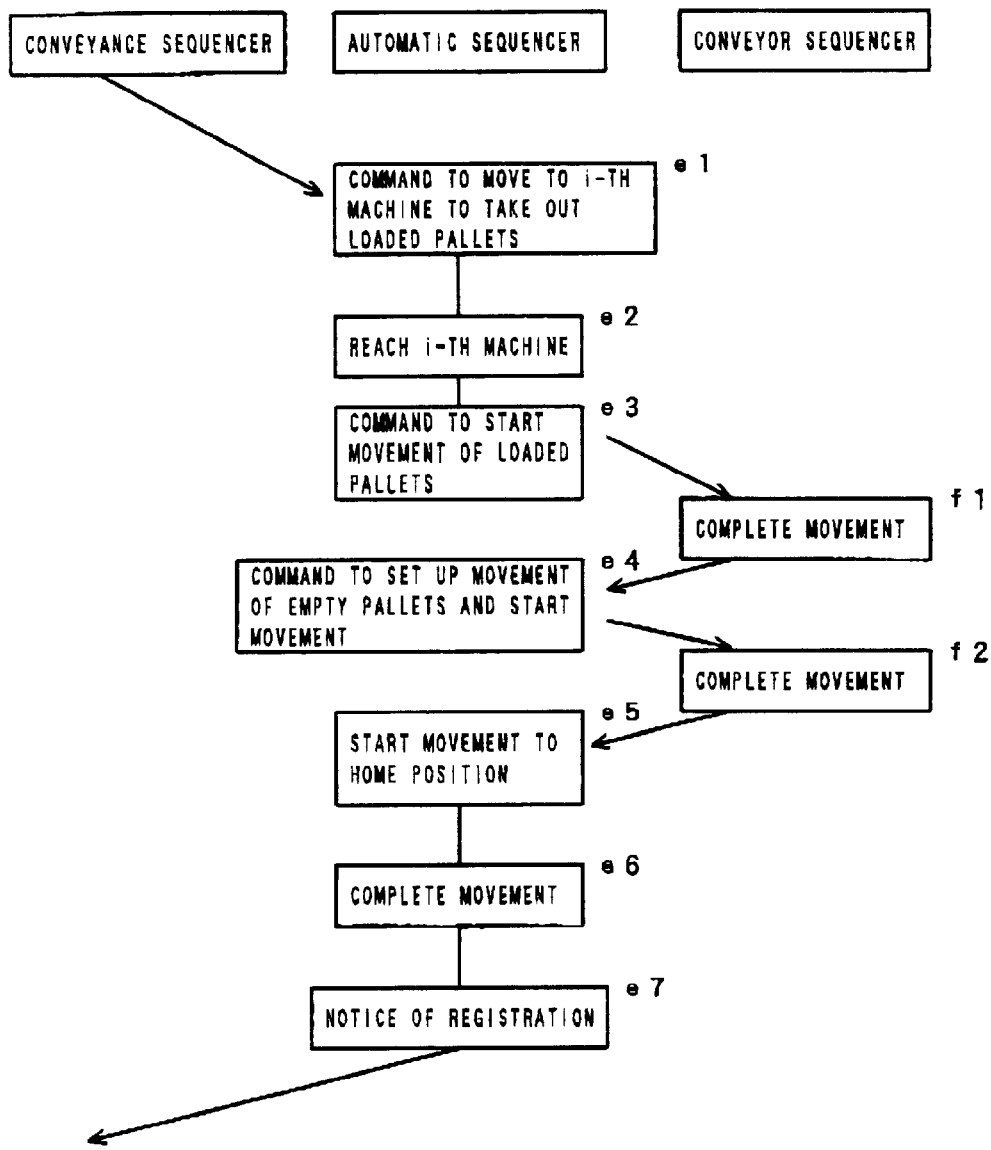
FIG. 6 is a flowchart showing an outline of processing to be performed by an automatic guided vehicle controller.

FIG. 6 shows an outline of the sequence in the controller of the automatic guided vehicle 102 started in response to the automatic pallet request signal.

In response to the move command from the conveyance indicator 104, the automatic guided vehicle 102 firstly moves to the position of the objective molding cell Ai along the track 101 according to the operation program stored in its own controller (Steps e1 and e2), transmits data by optical communication to or from the conveyor station Ei of the molding cell Ai to decide whether the pallets adapted to be loaded with the products at this point in time are placed on the pallet placing portion Eia or Eib and issues a command to the controller of the conveyor station Ei to carry in the pallets placed on the pallet placing portion not engaged in the operation to load the products, that is, the pallets already loaded with the molded products for one lot to the automatic guided vehicle 102 (Step e3).

In response to this command, the conveyor station Ei controls drive of the handling robot bi to load the pallets placed on the pallet placing portion not engaged in the operation to load the products at this point of time, that is, the pallets already loaded with the molded products for one lot into the automatic guided vehicle 102 and returns the operation completion signal to the controller of the automatic guided vehicle 102 in the stage of finishing the loading operation (Step f1).

In response to the operation completion signal, the automatic guided vehicle 102 issues a command to the conveyor station Ei to transfer the empty pallets carried by the automatic guided vehicle itself from the automatic guided vehicle to the pallet placing portion not engaged in the operation to load the products at present, that is, the pallet placing portion, from which the loaded pallets have been already carried out through the processing in Step f1 (Step e4), and the conveyor station Ei controls drive of the handling robot bi in response to this command to load the empty pallets from the automatic guided vehicle 102 into the pallet placing portion not engaged in the operation to load the products and returns the operation completion signal to the controller of the automatic guided vehicle 102 at the stage of finishing the loading operation (Step f2).

In response to the operation completion signal, the automatic guided vehicle 102 starts moving toward the home position again (Step e5), then stops the movement when reaching the home position (Step e6) and transmits data by optical communication to or from the conveyance indicator 104 to inform the conveyance controller 103 that the automatic guided vehicle returns to its home position, that the movement of the automatic guided vehicle is based on the automatic pallet request signal, and that the target molding cell is the Ai-numbered molding cell on this occasion (Step e7).

The home position return signal from the automatic guided vehicle 102 is detected through the decision processing in Step b2 included in the supervisory processing on the side of the conveyance controller 103 shown in FIG. 4. The conveyance controller 103 decides whether the movement of the automatic guided vehicle 102 on this occasion is based on the manual pallet request signal or the automatic pallet request signal (Step b3), and on this occasion, the automatic guided vehicle is moved on the basis of the automatic pallet request signal.

This means that the automatic guided vehicle 102 carries back the pallets loaded with the molded products for one lot, that is, each pallet already loaded with the product needs to be labeled according to the kind of products or be stored in the product stock space, that is, the lower stock space 108a of the pallet stocker 108.

While it is necessary to detect the kind of products for the purpose of labeling each pallet already loaded with the product according to the kind of products, the data related to the movement of the automatic guided vehicle 102 has been already deleted at this stage from the memory of the conveyance controller 103 through the process in Step b12 described above, and as a result, it is not possible to detect the kind of molded products from the information in the memory of the conveyance controller 103. In this case, the conveyance controller 103 accesses the schedule storage means 105 via the Ethernet line 100 based on the molding cell number Ai given from the automatic guided vehicle so as to detect the kind of products molded in the molding cell Ai, that is, the information to be attached to the carried-in pallet on this occasion from the file expected to be run in the molding cell Ai, then outputs the data related to the kind of molded products to the label printer 111 so as to store this data temporarily therein (Step b4) and further issues a command to the robot controller 10 so as to collect the pallets loaded with the products (Step b5).

As shown in FIG. 5, the command to collect the pallets loaded with the products is detected through the processing in Step c1 on the side of the robot controller 110. The label printer 111 temporarily containing the information to be attached to the pallets prints out this information onto a sheet.

After the robot controller 110 has detected the pallet collection command, the robot controller 110 receives the information related to the kind of molded products from the conveyance controller 103 temporarily containing the information related to the molding cell Ai (Step c10), sticks a sheet received from the label printer 111 on each pallet loaded with the product on the automatic guided vehicle 102, selects the lane of the lower stock space 108a, that is, one of the inclined coasting conveyors 112a to 112h according to the kind of molded products and controls drive of the handling robot 109 to stack up the pallets on the upstream end (i.e., the left end in FIG. 2b) of the inclined coasting conveyor.

That is, similar to the case of the upper stock space 108b described above, the kinds of products to be stored have a one-to-one correspondence with the lanes also in the lower stock space 108a.

The pallet in the lower layer at the upstream end of the inclined coasting conveyor is fixed by the lock pin 115 and in consequence, is not in danger of slipping unnecessarily along the inclined coasting conveyor, while the other pallets stacked up on the pallet in the lower layer are vertically fitted to each other through irregular fit portions provided on the lower and upper circumferential surfaces of the pallets, resulting in no danger of falling to pieces unnecessarily.

After the robot controller 110 has stacked up new pallets, the robot controller 110 decides whether or not a value of a stack count storage register reg2k corresponding to the lane stacked with the new pallets reaches (MAX2k−1), that is, the count of the stacked pallets, inclusive of the pallets newly stacked up on this occasion, reaches the permissible maximum value MAX2k (Step c12). When the value of the stack count storage register reg2K does not reach (MAX2k−1), it means that at least one more pallet loading operation is permitted in the present state as it is, and consequently, the robot controller 110 increments the value of the stack count storage register reg2K by 1 to store the fact that one more pallet has been newly stacked up (Step c17), and ends the processing related to loading of the pallets loaded with the products as it is.

Further, when the value of the stack count storage register reg2k reaches (MAX2k−1), it means that the count of stacked pallets, inclusive of the pallets newly stacked up on this occasion, reaches the permissible maximum value MAX2k, and it becomes impossible to perform the subsequent pallet loading operation in the present state as it is.

In such a case, the robot controller 110 operates the solenoid drive means or the like of the inclined coasting conveyor of the corresponding lane to retreat the lock pin 115 (Step c13) and controls drive of the handling robot 109 to move the pallets for one packet from the upstream end toward the downstream (Step c14) by pressing the pallets located at the upstream end of the corresponding inclined coasting conveyor toward the downstream with the handling robot 109 so as to feed these pallets by a distance corresponding to the pallet width or more.

While use is made of the inclined coasting conveyors which make it possible to move the pallets from the upstream end toward the downstream by the use of the weight of the products and pallets and gravity only by retreating the lock pin 115 as a matter of course, these pallets are also fed forcibly in this embodiment by utilizing a pressing operation with the handling robot 109 and in consequence, may be prevented from being caught unnecessarily in the course of conveyance, resulting in a reduction of time required for movement. Accordingly, a small inclination angle is sufficient for each inclined coasting conveyor, the packet of the pallets may be less shocked when stopped on the downstream side, and the pallets loaded with the products may be prevented from falling unnecessarily. Further, it may be possible to provide a pallet presence detecting sensor at the upstream end of the inclined coasting conveyor so as to feed the pallets forcibly by utilizing the pressing operation with the handling robot 109 only when the presence of the pallets is confirmed even after a lapse of predetermined time since the lock pin 115 was retreated, that is, when the feed of the pallets by making use of the own weight of the pallets and products and the gravity is not well performed.

After the robot controller 110 has moved the pallets for one packet from the upstream end toward the downstream with the handling robot 109, the robot controller 110 operates the solenoid drive means or the like again to project the lock pin 115 so as to hold the pallet loaded with the product carried by the next loading operation at the upstream end of the inclined coasting conveyor as it is (Step c15), initializes the value of the stack count storage register reg2k to 0 and stores the fact that the stack of pallets at the upstream end of the inclined coasting conveyor, that is, at the loading position of the pallets loaded with the products is initialized to zero (Step c15).

The initial value of the stack count storage register reg2k is zero. As described the above, since the pallets loaded with the different kinds of products may be stored for every lane of the inclined coasting conveyors 112a to 112h on the lower side of the pallet stocker 108 in this embodiment, there are eight pieces of stack count storage registers reg2K, k=1 to 8, that is, as many as the kinds of pallets (products) or the lanes, and the permissible maximum value MAX2k of the stacked pallets varies on a lane-by-lane basis in some cases. Depending on the pallet information of the file read from the schedule storage means 105 through the processing in Step c11, it is decided that accessing the inclined coasting conveyor of which lane is made or a value of which stack count storage register reg2K is incremented.

In the following process, the automatic pallet request signal and its corresponding molding cell number Ai are written in association with each other into the common information storage means 107 every time the counter of the injection molding machine of any molding cell counts the products of that lot until the production for one lot is completed, and the processing operation similar to the above is repeatedly performed by the conveyance controller 103, the robot controller 110, the automatic guided vehicle 102, the label printer 111 and the conveyor station Ei of each cell, so that the pallets loaded with the products for one lot are carried to any of the lanes of the lower stock space 108a of the pallet stocker 108 according to the kind of products, while the empty pallets are newly carried according to the kind of products one by one from the temporary support table 117 for the pallets corresponding to the products to the conveyor station Ei of the injection molding machine already having made the production for one lot, and besides, the empty pallets corresponding to the products (at the position on the temporary support table 117) are taken out for one packet at a time from any lane of the upper stock space 108b of the pallet stocker 108 and then are carried automatically to the temporary support table 117 if the pallets on the temporary support table 117 run out.

In the pallet stocker 108, a sensor to detect that the lane of the lower stock space 108a was filled up with the pallets loaded with the products and a sensor to detect that the empty pallets on the lane of the upper stock space 108b ran out are provided for every lane, and when any lane of the lower stock space 108a of the pallet stocker 108 was filled up with the pallets loaded with the products or the empty pallets on any lane of the upper stock space 108b of the pallet stocker 108 ran out, the information representing the result of detection described above, that is, data representing the kind of products corresponding to the lane which was filled up with the pallets loaded with the products or the lane, in which the empty pallets ran out, is sent to the centralized controller B through the robot controller 110, the conveyance controller 103 and the Ethernet line 100.

As a matter of course, the pallets for the same kind of products may be stored across a plurality of lanes in not only the lower stock space 108a but also the upper stock space 108b. When the specific lane was filled up with the pallets loaded with the products or the empty pallets on the specific lane ran out in case where the pallets for the same kind of products are stored across the plurality of lanes, a molding operation may be performed continuously if there are other lanes available to store the same kind of products or other lanes stored with the empty pallets for the same kind of products. Only when the empty pallets on all the lanes corresponding to the specific products ran out, and all the lanes to store the specific products were filled up with the pallets, the continuance of the molding operation for the specific products is supposed to be impossible ultimately.

The centralized controller B specifies the molding cell available for molding the products on the basis of the data representing the kind of products and issues a command to the specified molding cell so as to stop the production for the next lot. In response to this command, the injection molding machine stops the injection molding operation whenever the production of the current lot is completed, resulting in no transition to the production for the next lot. That is, the automatic pallet request signal is not outputted, and as a result, the pallets loaded with the products of the final lot are left on the conveyor station of the molding cell as they are.

As described the above, while the operation itself to write the detected manual or automatic pallet request signal (information) from each molding cell Ai into the common information storage means 107 is performed by the centralized controller B, this pallet request signal is not directly sent from the centralized controller B to the conveyance controller 103 and the conveyance indicator 104 serving as the lower controller of the conveyance controller or the robot controller 110, but is stored as it is in the common information storage means 107 until the conveyance controller 103 accesses the common information storage means 107 to read this pallet request signal, so that the centralized controller B may write the information related to the pallet request signal into the common information storage means 107 immediately after the detection of the manual or automatic pallet request signal from each molding cell Ai, even when the conveyance controller 103 performs different processing, that is, under such a condition that the centralized controller B cannot make sure of direct communication with the conveyance controller 103.

Further, since the pallet request signal written into the common information storage means 107 is deleted therefrom through the processing on the side of the conveyance controller 103 whenever the conveyance controller 103 makes access to the common information storage means to complete reading of the information, the centralized controller B does not need to monitor the information related to the pallet request signal at all after the centralized controller B has detected the pallet request signal and then has written into the common information storage means 107.

On the other hand, since the centralized controller B accesses each molding cell Ai to read the manual or automatic pallet request signal from each molding cell Ai through the spontaneous processing of the centralized controller B according to the program on the side of the centralized controller B without starting the action in response to the random request from each molding cell Ai, the centralized controller B does not need to respond to a troublesome interrupt request nor detect the pallet request signal from each molding cell Ai through the multitask processing of high degree on condition that the centralized controller B performs its own internal processing.

Consequently, the centralized controller B may attain a function satisfactorily with an inexpensive computer generally called a personal computer or the like without the need of any function only to perform the preemptive multitask processing, resulting in a reduction of cost required for building the whole system.

Further, since the centralized controller B, the conveyance controller 103 and the controller of each molding cell Ai are interconnected in a daisy chain form via the communication line 100, there arises no problem in an increase of a line in number or size, even if a large number of controllers to be connected are needed.

Each controller directly accesses the common information storage means 107 to read, write or erase information simply by incorporating a driver software suitable for the common information storage means 107 into each controller with no need of two-way data communication between these controllers and the centralized controller B. That is, there is no need of any complicated communication protocol.

According to the present invention, even in the case of transmitting information among a large number of machine controllers, the information may be transmitted without the increase of the I/O port or communication line in number nor the complicated lead-around of the communication line. One I/O port may be sufficient for each controller irrespectively of the number of controllers, and the signal line does not need to increase in number, resulting in a reduction of cost required for setting up the devices.

Further, since the storage means for the transmission of information is shared with all the controllers, it is possible to share the information without using any complicated protocols but the use of only one protocol simply by incorporating the driver software corresponding to the storage means such as the hard disc into each controller.

When the information to be processed increases volume to cause a shortage of memory, it may be possible to replace the storage means for the transmission of information with a mass storage means, or to install more storage means, so that the memory does not need to increase in number individually for every controller, providing a simplified operation without any cost for the increase of memory.

Since there is no restriction with the hardware such as the communication line and I/O port or the communication protocol, the capabilities of the controller may be expanded by means of updating only the software, providing excellent expandability with a reduction of investment in equipment attendant on the expansion of the capabilities.

The system extension is facilitated at low cost, and the maintenance inspection related to hardware is also facilitated.

Further, the handling robot of the stock cell does not need to move in the travel direction of the conveyor, that is, in the longitudinal direction of the stock space, resulting in a reduction of time required for the delivery of stocks. Further, since the handling robot is arranged against the lower and upper stock spaces respectively formed by the plurality of horizontally parallel conveyors such that the operational range of the handling robot reaches one of the ends of all the conveyors, it is sufficient to use only one handling robot, and besides, the stocks may be transshipped by one handling robot to or from another conveyance means, i.e., the automatic guided vehicle with no need of more robots for warehousing and delivery, resulting in a reduction of cost required for building the system.

Further, since the lower stock space to store the pallets loaded with the products may be formed by the plurality of horizontally parallel conveyors, the stocks may be controlled simply by using the conveyors properly according to the kind of products.

Further, since the upper stock space is used to store the empty pallets, the constituent members for the upper stock space and the struts or the like to support the upper stock space do not need high strength, and the conveyors of the lower stock space are formed as the simple inclined coasting conveyors which descend with the distance from the handling robot, resulting in a substantial reduction of cost required for constructing the system.

What is claimed is:

1. An information transmitting system for use in a factory, comprising:
    a plurality of controllers for controlling various machines in the factory;
    a communication line for interconnecting said plurality of controllers; and
    a storage device connected to said communication line storing information regarding operations of the controllers;
    wherein said plurality of controllers transmit information regarding operations of the controllers to each other through said storage device and obtain information from said storage device by making access to said storage device.

2. An information transmitting system, comprising:
    a plurality of lower conveyors arranged substantially horizontally and parallel to each other and having a same traveling direction, to form lower stock spaces;
    a plurality of upper conveyors arranged substantially horizontally and parallel to each other above said lower conveyors and having the same traveling direction, to form upper stock spaces on said lower stock space in layers; and
    a handling robot disposed in a vicinity of one end of said lower and upper conveyors so that an operational range of the handling robot reaches said one end of said lower and upper stock spaces, the robot capable of taking out a first pallet stored in said lower stock space and a second pallet stored in said upper stock space from the respective stock spaces and putting said first and second pallets into the respective stock spaces.

3. An information transmitting system for use in a factory, comprising:
    a plurality of machining cells for performing machining by machines;
    a first controller provided in every machining cell for controlling each machining cell;
    a stock cell for collecting and storing products produced by said machines;
    automatic conveyance means for conveying stocks between said plurality of machining cells and said stock cell;
    a second controller for controlling said automatic conveyance means and said stock cell;
    a central controller for centrally controlling said machining cells and said stock cell;
    a communication line for interconnecting said first controller, said second controller and said central controller; and
    storage means connected to said communication line wherein
        said first controller, said second controller and said central controller transmit information to each other through said storage means;
        said first and said second controllers read information stored from said storage means by making access to said storage means;
        said central controller controls conveyance of the stocks between each machining cell and said stock cell; and
        said stock cell comprises
            a plurality of lower conveyors arranged substantially horizontally and parallel to each other and having the same traveling direction, to form lower stock spaces;
            a plurality of upper conveyors arranged substantially horizontally and parallel to each other above said lower conveyors and having the same traveling direction, to form upper stock spaces on said lower stock space in layers; and
            a handling robot disposed in the vicinity of one end of said lower and upper conveyors so that an operational range of the handling robot reaches said one end of said lower and upper stock spaces, for taking out a first pallet stored in said lower stock space and a second pallet stored in said upper stock space from the respective stock spaces and for putting said first and second pallets into the respective stock spaces.

4. An information transmitting system according to claim 3, wherein said first pallet is loaded with products produced by said machine, and said second pallet is loaded with no product.

5. An information transmitting system according to claim 3, wherein said lower conveyors comprise inclined coasting conveyors descending with the distance from said handling robot, and said upper conveyors comprise drive conveyors for feeding the second pallets towards said handling robot.

6. An information transmitting system according to claim 5, wherein each of said lower and upper conveyors has a lock pin independently arranged on one end close to said handling robot so as to lock up the pallets on said one end or release the pallets from the locked state.

7. An information transmitting system for use in a factory, comprising:

a plurality of machining cells for performing machining by machines;

a first controller provided in every machining cell for controlling each machining cell;

a stock cell for collecting and storing products produced by said machines;

an automatic conveyance device conveying stocks between said plurality of machining cells and said stock cell;

a second controller for controlling said automatic conveyance device and said stock cell;

a central controller for centrally controlling said machining cells and said stock cell;

a communication line for interconnecting said first controller, said second controller and said central controller; and a storage device connected to said communication line storing information regarding operations of the first controller and the second controller;

wherein said first controller, said second controller and said central controller transmit information regarding operations of the first controller and the second controller to each other through said storage device, said first and said second controllers read information stored from said storage means by making access to said storage device, and said central controller controls conveyance of the stocks between each machining cell and said stock cell.

* * * * *